(12) United States Patent
Iwata et al.

(10) Patent No.: US 10,822,525 B2
(45) Date of Patent: *Nov. 3, 2020

(54) POLISHING COMPOSITION AND METHOD FOR POLISHING MAGNETIC DISK SUBSTRATE

(71) Applicant: YAMAGUCHI SEIKEN KOGYO CO., LTD., Aichi (JP)

(72) Inventors: Toru Iwata, Aichi (JP); Akira Sugawa, Aichi (JP)

(73) Assignee: YAMAGUCHI SEIKEN KOGYO CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,925

(22) Filed: Mar. 26, 2018

(65) Prior Publication Data

US 2018/0215953 A1   Aug. 2, 2018

Related U.S. Application Data

(63) Continuation of application No. PCT/JP2016/077369, filed on Sep. 16, 2016.

(30) Foreign Application Priority Data

Sep. 25, 2015   (JP) .................................. 2015-188840

(51) Int. Cl.
| | |
|---|---|
| C09G 1/02 | (2006.01) |
| C09K 3/14 | (2006.01) |
| B24B 37/00 | (2012.01) |
| C09G 1/16 | (2006.01) |
| G11B 5/84 | (2006.01) |
| B24B 37/04 | (2012.01) |

(52) U.S. Cl.
CPC .............. *C09G 1/16* (2013.01); *B24B 37/044* (2013.01); *C09K 3/1463* (2013.01); *G11B 5/84* (2013.01); *G11B 5/8404* (2013.01); *B24B 37/048* (2013.01); *C09G 1/02* (2013.01)

(58) Field of Classification Search
None
See application file for complete search history.

(56) References Cited

U.S. PATENT DOCUMENTS

| | | | |
|---|---|---|---|
| 6,261,476 B1 | 7/2001 | Kwok et al. | |
| 6,319,096 B1 | 11/2001 | Mueller et al. | |
| 7,531,600 B1 * | 5/2009 | Rey ........................... | C02F 1/56 |
| | | | 210/698 |
| 9,856,401 B2 * | 1/2018 | Iwata .................... | C09K 3/1409 |
| 9,862,863 B2 * | 1/2018 | Iwata .................... | C09K 3/1409 |
| 2002/0002797 A1 | 1/2002 | Miyata et al. | |
| 2002/0102923 A1 | 1/2002 | Sugiyama et al. | |
| 2002/0028632 A1 * | 3/2002 | Shimamoto .............. | C09G 1/02 |
| | | | 451/36 |
| 2003/0029095 A1 | 2/2003 | Ishitobi et al. | |
| 2003/0121214 A1 | 7/2003 | Ishibashi | |
| 2004/0221516 A1 | 11/2004 | Cho et al. | |
| 2009/0042485 A1 | 2/2009 | Yamaguchi | |
| 2009/0111359 A1 | 4/2009 | Suzuki et al. | |
| 2010/0009537 A1 | 1/2010 | Balasubramaniam et al. | |
| 2011/0203186 A1 | 8/2011 | Oshima et al. | |
| 2012/0045974 A1 | 2/2012 | Nakanishi et al. | |
| 2012/0094491 A1 * | 4/2012 | Kanamaru ............... | C09G 1/02 |
| | | | 438/693 |
| 2014/0191155 A1 * | 7/2014 | Reiss ....................... | C09G 1/02 |
| | | | 252/79.5 |
| 2017/0015867 A1 | 1/2017 | Iwata et al. | |
| 2017/0015868 A1 | 1/2017 | Iwata et al. | |
| 2018/0273803 A1 * | 9/2018 | Iwata .................... | G11B 5/8404 |
| 2019/0119423 A1 * | 4/2019 | Iwata .................... | G11B 23/505 |

FOREIGN PATENT DOCUMENTS

| | | |
|---|---|---|
| JP | 2001207161 A | 7/2001 |
| JP | 200126005 A | 9/2001 |
| JP | 2002167575 A | 6/2002 |
| JP | 2003510446 A | 3/2003 |
| JP | 2003514950 A | 4/2003 |
| JP | 2003160781 A | 6/2003 |
| JP | 2004331852 A | 11/2004 |
| JP | 2005008875 A | 1/2005 |
| JP | 2007063372 A | 3/2007 |
| JP | 2007130728 A | 5/2007 |
| JP | 2008-179763 A | 8/2008 |
| JP | 2009176397 A | 8/2009 |
| JP | 2010167553 A | 8/2010 |
| JP | 2011204327 A | 10/2011 |
| JP | 2011527643 A | 11/2011 |
| JP | 2012043493 A | 3/2012 |
| JP | 2012155785 A | 8/2012 |
| JP | 2014029754 A | 2/2014 |
| JP | 2014029755 A | 2/2014 |
| JP | 2015-125792 A | 7/2015 |
| JP | 2015146942 A1 | 10/2015 |
| WO | 2004104122 A2 | 12/2004 |
| WO | 2015146941 A1 | 10/2015 |

OTHER PUBLICATIONS

PCT/JP2016/077369 International Search Report dated Nov. 18, 2016; 2 pgs.

* cited by examiner

*Primary Examiner* — Shamim Ahmed
(74) *Attorney, Agent, or Firm* — Bracewell LLP; Brad Y. Chin (57) ABSTRACT

Embodiments provide a polishing composition containing colloidal silica, pulverized wet-process silica particles, and a water-soluble polymer compound. According to at leaset one embodiment, the water-soluble polymer compound is a copolymer containing a structural unit derived from an unsaturated aliphatic carboxylic acid and a structural unit derived from an unsaturated amide.

8 Claims, 1 Drawing Sheet

POLISHING COMPOSITION AND METHOD FOR POLISHING MAGNETIC DISK SUBSTRATE

CROSS REFERENCE TO RELATED APPLICATIONS

This application claims the benefit of and priority under 35 U.S.C. § 119 to PCT Patent Application No. PCT/JP2016/077369, entitled, "POLISHING COMPOSITION AND METHOD FOR POLISHING MAGNETIC DISK SUBSTRATE," filed on Sep. 16, 2016, which claims priority to Japanese Patent Application No. JP 2015-188840, entitled, "POLISHING COMPOSITION AND METHOD FOR POLISHING MAGNETIC DISK SUBSTRATE," filed on Sep. 25, 2015, which are hereby incorporated by reference in their entirety into this application.

BACKGROUND

Field

Embodiments relate to a polishing composition used for polishing an electronic component, such as a semiconductor or a magnetic recording medium including a hard disk. Particularly, embodiments relate to a polishing composition used for polishing a surface of a substrate for a magnetic recording medium such as a glass magnetic disk substrate or an aluminum magnetic disk substrate. Furthermore, embodiments relate to a polishing composition used for polishing a surface of an aluminum magnetic disk substrate for a magnetic recording medium, having an electroless nickel-phosphorus plated film formed on a surface of an aluminum alloy substrate.

Description of the Related Art

Conventionally, as a polishing composition for polishing an electroless nickel-phosphorus plated film surface of an aluminum magnetic disk substrate, a polishing composition obtained by dispersing alumina particles having relatively large particle sizes capable of realizing a high polishing rate in water has been used from a viewpoint of productivity. However, in a case of using alumina particles, the alumina particles have a considerably higher hardness than the electroless nickel-phosphorus plated film of the aluminum magnetic disk substrate. Therefore, the alumina particles are embedded in the substrate, and the embedded particles have a bad influence on a subsequent polishing step disadvantageously.

As a solution to such a problem, a polishing composition combining alumina particles and silica particles has been proposed (See, for example, Patent Documents 1 to 4 and the like). In addition, a polishing method only with silica particles without using alumina particles has been proposed (See, for example, Patent Documents 5 to 10). Furthermore, an additive for reducing edge rounding (roll-off) of a substrate in a case where polishing is performed only with silica particles has been studied (See, for example, Patent Documents 11 to 15).

CITATION LIST

Patent Documents

[Patent Document 1] JP-A-2001-260005
[Patent Document 2] JP-A-2009-176397
[Patent Document 3] JP-A-2011-204327
[Patent Document 4] JP-A-2012-43493
[Patent Document 5] JP-A-2010-167553
[Patent Document 6] JP-A-2011-527643
[Patent Document 7] JP-A-2014-29754
[Patent Document 8] JP-A-2014-29755
[Patent Document 9] JP-A-2003-514950
[Patent Document 10] JP-A-2012-155785
[Patent Document 11] JP-A-2002-167575
[Patent Document 12] JP-A-2003-160781
[Patent Document 13] JP-A-2003-510446
[Patent Document 14] JP-A-2007-63372
[Patent Document 15] JP-A-2007-130728

SUMMARY

By combining alumina particles and silica particles as in Patent Documents 1 to 4, it is possible to remove alumina particles embedded in a substrate to some extent. However, as long as a polishing composition containing alumina particle is used, a possibility that the alumina particles contained in the polishing composition are embedded in a substrate still remains. In addition, such a polishing composition contains both alumina particles and silica particles. Therefore, characteristics possessed by the particles are mutually canceled and a polishing rate and surface smoothness are deteriorated disadvantageously.

Therefore, a polishing method only with silica particles without using alumina particles has been proposed. In Patent Documents 5 and 6, a combination of colloidal silica and a polishing accelerator has been proposed. Patent Documents 7 and 8 have proposed a polishing method with colloidal silica, fumed silica, surface modified silica, silica manufactured by a water glass process, or the like, particularly a method using colloidal silica having a special shape. However, with these methods, a polishing rate is insufficient and improvement is demanded. In addition, Patent Document 9 has proposed a method using colloidal silica and fumed silica in combination. However, while this method results in an improvement in the polishing rate, the fumed silica has very low bulk density, leading to significant worsening of workability, such as in the preparation of slurries, and also having concerns about health due to its dusts. In addition, Patent Document 10 has proposed a method for providing a polishing rate close to that of alumina particles by using crushed silica particles. However, with this method, there is a problem that surface smoothness is deteriorated, and improvement is demanded.

In the polishing method only with silica particles, a problem in roll-off is larger than in a case where alumina particles are used. Various additives have also been studied for reducing roll-off. For example, addition of a nonionic surfactant (Patent Documents 11 and 12), addition of a cellulose derivative (Patent Document 13), addition of an alkylbenzene sulfonic acid-based surfactant or a polyoxyethylene sulfate-based surfactant (Patent Document 14 and 15), and the like have been proposed. However, reduction in roll-off is observed due to these additives, but an effect thereof is insufficient depending on compatibility with silica particles. In addition, a polishing rate is significantly lowered disadvantageously.

Embodiments of the invention have been achieved in view of such a problem of related art. Embodiments provide a polishing composition capable of realizing a high polishing rate and simultaneously achieving good surface smoothness and reduction in roll-off without using alumina particles.

As a result of intensive studies to achieve the above object, the inventors have found that by combining colloidal silica with wet-process silica particles formed through a pulverization step and adding a specific water-soluble polymer compound, an unexpectedly higher polishing rate, better surface smoothness, and more reduction in roll-off can be achieved than in a case of single use of the silica particles, thus completing the various embodiments of the invention.

That is, embodiments provide the following polishing compositions.

According to at least one embodiment, there is provided a polishing composition containing colloidal silica, pulverized wet-process silica particles, and a water-soluble polymer compound, in which the water-soluble polymer compound is a copolymer containing a structural unit derived from an unsaturated aliphatic carboxylic acid and a structural unit derived from an unsaturated amide.

According to at least one embodiment, the colloidal silica has an average particle size of 5 to 200 nm, and the wet-process silica particles have an average particle size of 0.1 to 1.0 μm.

According to at least one embodiment, a value of a ratio of the average particle size of the wet-process silica particles with respect to the average particle size of the colloidal silica is 2.0 to 30.0.

According to at least one embodiment, the total concentration of the colloidal silica and the wet-process silica particles is 1 to 50% by mass, and a ratio of the colloidal silica is 5 to 95% by mass and a ratio of the wet-process silica particles is 5 to 95% by mass with respect to the total mass of the colloidal silica and the wet-process silica particles.

According to at least one embodiment, the water-soluble polymer compound is a copolymer having a molar ratio of 95:5 to 5:95 between the structural unit derived from an unsaturated aliphatic carboxylic acid and the structural unit derived from an unsaturated amide.

According to at least one embodiment, the copolymer is formed of a combination of acrylic acid and/or a salt thereof and N-alkylacrylamide, a combination of acrylic acid and/or a salt thereof and N-alkylmethacrylamide, a combination of methacrylic acid and/or a salt thereof and N-alkylacrylamide, or a combination of methacrylic acid and/or a salt thereof and N-alkylmethacrylamide.

According to at least one embodiment, the water-soluble polymer compound has a weight average molecular weight of 3000 to 1,000,000.

According to at least one embodiment, the water-soluble polymer compound has a content of 0.0001 to 1.0% by mass.

According to at least one embodiment, an aqueous composition further containing an acid and an oxidizing agent and having a pH value of 0.1 to 4.0.

According to at least one embodiment, the polishing composition is used for polishing an electroless nickel-phosphorus plated aluminum magnetic disk substrate.

According to another embodiment, there is provided a method for polishing a magnetic disk substrate, including polishing a magnetic disk substrate using the polishing composition discussed above.

Embodiments provide non-obvious advantages over the conventional art. For example, by using a combination of two kinds of silica particles for polishing a surface of an aluminum magnetic disk substrate for a magnetic recording medium in which an electroless nickel-phosphorus plated film is formed on a surface of an aluminum alloy substrate, the polishing composition according to various embodiments can realize a higher polishing rate and simultaneously obtain better surface smoothness than in a case of single use of the silica particles. Furthermore, the polishing composition according to various embodiments can reduce roll-off by adding a specific water-soluble polymer compound together with the two kinds of silica particles.

BRIEF DESCRIPTION OF DRAWINGS

These and other features, aspects, and advantages of the various embodiments are better understood with regard to the following Detailed Description, appended Claims, and accompanying Figure. It is to be noted, however, that the Figure illustrates only various embodiments and are therefore not to be considered limiting of the invention's scope as it may include other effective embodiments as well.

DETAILED DESCRIPTION

Hereinafter, various embodiments of the invention will be described. However, the invention is not limited to the following embodiments. It should be understood that matters obtained by performing modification of the following embodiment, improvement thereof, or the like appropriately within a range not departing from the gist of the invention based on usual knowledge of a person skilled in the art are also included in the scope of the invention.

1. Polishing Composition

The polishing composition according to at least one embodiment is an aqueous composition containing at least colloidal silica, wet-process silica particles, and a water-soluble polymer compound. The water-soluble polymer compound is a copolymer containing a structural unit derived from an unsaturated aliphatic carboxylic acid and a structural unit derived from an unsaturated amide. The colloidal silica preferably has an average particle size of 5 to 200 nm. The wet-process silica particles preferably have an average particle size of 0.1 to 1.0 μm. A value of a ratio (B/A) of an average particle size (B) of the wet-process silica particles with respect to an average particle size (A) of the colloidal silica is preferably 2.0 to 30.0. Here, the wet-process silica particles are pulverized by pulverization in a manufacturing process thereof. That is, the process for manufacturing the wet-process silica particles includes a pulverization step.

According to at least one embodiment, the polishing composition contains colloidal silica and specific wet-process silica particles, and therefore achieves an unexpectedly higher polishing rate and simultaneously better surface smoothness than in a case of single use of the silica particles. In general, in a case where particles having large particle sizes (mainly wet-process silica particles in a case of an embodiment) and particles having small particle sizes (mainly colloidal silica in the case of an embodiment) are used in combination, a polishing rate thereof and surface smoothness thereof tend to be controlled by a polishing rate and surface smoothness brought by the particles having large particle sizes. That is, in general, a polishing rate is not much larger than the polishing rate achieved by particles having large particle sizes. In addition, surface smoothness is equal to that provided by particles having large particle sizes, and the surface smoothness is inferior to that provided by the particles having small particle sizes. However, the polishing composition according to at least one embodiment has a significantly higher polishing rate and maintains better surface smoothness than in a case of single use of colloidal silica or wet-process silica particles. Such an effect can be said to be a remarkable effect unexpected from conventional technical common knowledge.

According to at least one embodiment, the polishing composition reduces roll-off by containing a water-soluble polymer compound which is a copolymer containing a structural unit derived from an unsaturated aliphatic carboxylic acid and a structural unit derived from an unsaturated amide in addition to the above-described colloidal silica and specific wet-process silica particles. The effect of reducing roll-off due to the water-soluble polymer compound is exhibited in a case where colloidal silica and specific wet-process silica particles are used in combination. That is, the effect is not exhibited in a combination of the water-soluble polymer compound and the colloidal silica alone, or a combination of the water-soluble polymer compound and the wet-process silica particles alone.

Hereinafter, the polishing composition according to various embodiments will be described in more detail. In the following description, a simple term "polishing composition" means the polishing composition according to various embodiments, unless otherwise specified. In addition, in the following description, simple terms "colloidal silica" and "wet-process silica particles" mean colloidal silica and wet-process silica particles used in the various embodiments, respectively, unless otherwise specified.

1-1. Colloidal Silica

Colloidal silica contained in the polishing composition according to at least one embodiment preferably has an average particle size of 5 to 200 nm. The average particle size of 5 nm or more can suppress lowering of a polishing rate. The average particle size of 200 nm or less can suppress deterioration of surface smoothness. The average particle size of the colloidal silica is more preferably 5 to 150 nm, and still more preferably 30 to 100 nm. In addition, the average particle size in the present application is a median diameter (D50).

As the shape of the colloidal silica, a spherical shape, a chain shape, a kompeito-typed shape (like particles having convexes on the surface), a heteromorphic shape, or the like is known, and primary particles are monodispersed in water to form a colloid. As the colloidal silica used according to at least one embodiment, spherical or approximately spherical colloidal silica is particularly preferable. By using spherical or approximately spherical colloidal silica, surface smoothness can be further improved. The colloidal silica is obtained by a water glass process using sodium silicate or potassium silicate as a raw material, a method for hydrolyzing an alkoxysilane such as tetraethoxysilane with an acid or an alkali, or the like.

1-2. Wet-Process Silica Particles

Wet-process silica particles used according to at least one embodiment refer to particles prepared from wet-process silica obtained as precipitated silicic acid by adding an alkali silicate aqueous solution and an inorganic acid or an inorganic acid aqueous solution to a reaction vessel. The wet-process silica particles do not include the above-described colloidal silica.

Examples of the alkali silicate aqueous solution which is a raw material of the wet-process silica include a sodium silicate aqueous solution, a potassium silicate aqueous solution, and a lithium silicate aqueous solution, but in general, a sodium silicate aqueous solution is preferably used. Examples of the inorganic acid include sulfuric acid, hydrochloric acid, and nitric acid, but in general, sulfuric acid is preferably used. After completion of a reaction, a reaction solution is filtered, washed with water, and then dried with a dryer so as to have a water content of 6% or less. The dryer may be any one of a stationary dryer, a spray dryer, and a fluidized dryer. Thereafter, the dried product is pulverized with a pulverizer such as a jet mill, and is further classified to obtain wet-process silica particles.

The particle shape of each of the wet-process silica particles pulverized by pulverization as described above has a corner portion, and has higher polishing ability than a particle having an approximately spherical shape.

The wet-process silica particles have an average particle size of preferably 0.1 to 1.0 µm, more preferably 0.2 to 1.0 µm, still more preferably 0.2 to 0.6 µm. The average particle size of 0.1 µm or more can suppress lowering of a polishing rate. The average particle size of 1.0 µm or less can suppress deterioration of surface smoothness.

The value of the ratio (B/A) between the average particle size (B) of the wet-process silica particles and the average particle size (A) of the colloidal silica is preferably 2.0 to 30.0, more preferably 2.0 to 16.0, still more preferably 3.0 to 16.0, particularly preferably 3.0 to 10.0, and most preferably 4.0 to 10.0. The average particle size ratio of 2.0 or more can improve a polishing rate. The average particle size ratio of 30.0 or less can suppress deterioration of surface smoothness.

The total concentration of the colloidal silica and the wet-process silica particles is preferably 1 to 50% by mass, and more preferably 2 to 40% by mass with respect to the total mass of the polishing composition. The total concentration of the silica particles of 1% by mass or more can suppress lowering of a polishing rate. The total concentration of the silica particles of 50% by mass or less can maintain a sufficient polishing rate without using excessive silica particles.

A ratio of the colloidal silica with respect to the entire silica particles (the total mass of the colloidal silica and the wet-process silica particles) is preferably 5 to 95% by mass, and more preferably 20 to 80% by mass. The ratio of the colloidal silica of 5% by mass or more can suppress deterioration of surface smoothness. The ratio of the colloidal silica of 95% by mass or less can suppress lowering of a polishing rate.

A ratio of the wet-process silica particles with respect to the entire silica particles (the total mass of the colloidal silica and the wet-process silica particles) is preferably 5 to 95% by mass, and more preferably 20 to 80% by mass. The ratio of the wet-process silica particles of 95% by mass or less can suppress deterioration of surface smoothness. The ratio of the wet-process silica particles of 5% by mass or more can suppress lowering of a polishing rate.

1-3. Water-Soluble Polymer Compound

A water-soluble polymer compound used according to at least one embodiment is a copolymer containing a structural unit derived from an unsaturated aliphatic carboxylic acid and a structural unit derived from an unsaturated amide. That is, the water-soluble polymer compound is a polymer obtained by copolymerizing an unsaturated aliphatic carboxylic acid and/or a salt thereof and an unsaturated amide as monomers, and having a structural unit derived from an unsaturated aliphatic carboxylic acid and a structural unit derived from an unsaturated amide as essential structural units.

Examples of the unsaturated aliphatic carboxylic acid and a salt thereof include acrylic acid, methacrylic acid, maleic acid, itaconic acid, and salts thereof.

At least a part of the structural units derived from an unsaturated aliphatic carboxylic acid may be included in the water-soluble polymer compound as a carboxylate. Examples of the carboxylate include sodium carboxylate, potassium carboxylate, magnesium carboxylate, ammonium carboxylate, amine carboxylate, and alkylammonium carboxylate.

In order to cause a structural unit derived from an unsaturated aliphatic carboxylic acid to be included in the water-soluble polymer compound as carboxylic acid, an unsaturated aliphatic carboxylic acid may be polymerized as a monomer, or an unsaturated aliphatic carboxylate may be polymerized as a monomer and then the resulting polymer may be converted into carboxylic acid by cation exchange. In addition, in order to cause a structural unit derived from an unsaturated aliphatic carboxylic acid to be included in the water-soluble polymer compound as a carboxylate, an unsaturated aliphatic carboxylate may be polymerized as a monomer, or an unsaturated aliphatic carboxylic acid may be polymerized as a monomer and then the resulting polymer may be neutralized with a base to form a carboxylate.

In order to evaluate a ratio between a structural unit included as a carboxylic acid and a structural unit included as a carboxylate in a water-soluble polymer compound, a pH value of an aqueous solution of the water-soluble polymer compound can be used. In a case where the pH value of the aqueous solution of the water-soluble polymer compound is low, the content ratio of the structural unit included as carboxylic acid can be evaluated to be high. Meanwhile, in a case where the pH value of the aqueous solution of the water-soluble polymer compound is high, the content ratio of the structural unit included as a carboxylate can be evaluated to be high. According to at least one embodiment, for example, a water-soluble polymer compound having a pH value of 1 to 13 in a water-soluble polymer compound aqueous solution having a concentration of 10% by mass can be used.

As an unsaturated amide, $\alpha,\beta$-ethylenic unsaturated amide is preferably used. More specific examples thereof include an $\alpha,\beta$-ethylenic unsaturated carboxylic acid amide such as acrylamide, methacrylamide, N-alkylacrylamide, or N-alkylmethacrylamide.

Preferable specific examples of N-alkylacrylamide, N-alkylmethacrylamide, and the like include N-methylacrylamide, N-ethylacrylamide, N-n-propylacrylamide, N-iso-propylacrylamide, N-n-butylacrylamide, N-iso-butylacrylamide, N-sec-butylacrylamide, N-tert-butylacrylamide, N-methylmethacrylamide, N-ethylmethacrylamide, N-n-propylmethacrylamide, N-iso-propylmethacrylamide, N-n-butylmethacrylamide, N-iso-butylmethacrylamide, N-sec-butylmethacrylamide, and N-tert-butylmethacrylamide. Among these compounds, N-n-butylacrylamide, N-iso-butylacrylamide, N-sec-butylacrylamide, N-tert-butylacrylamide, N-n-butylmethacrylamide, N-iso-butylmethacrylamide, N-sec-butylmethacrylamide, and N-tert-butylmethacrylamide are particularly preferable.

It is preferable to form a copolymer by polymerizing these monomer components in combination. Preferable examples of a combination of copolymerization include a combination of acrylic acid and/or a salt thereof and N-alkylacrylamide, a combination of acrylic acid and/or a salt thereof and N-alkylmethacrylamide, a combination of methacrylic acid and/or a salt thereof and N-alkylacrylamide, and a combination of methacrylic acid and/or a salt thereof and N-alkylmethacrylamide. Among these combinations, a combination in which an alkyl group in N-alkylacrylamide or N-alkylmethacrylamide is at least one selected from the group consisting of an n-butyl group, an iso-butyl group, a sec-butyl group, and a tert-butyl group is particularly preferably used.

A molar ratio between a structural unit derived from an unsaturated aliphatic carboxylic acid and a structural unit derived from an unsaturated amide in the water-soluble polymer compound is preferably 95:5 to 5:95, and more preferably from 90:10 to 10:90.

A weight average molecular weight of the water-soluble polymer compound is preferably 3000 or more and 1,000,000 or less, and more preferably 5,000 or more and 500,000 or less. Note that the weight average molecular weight of the water-soluble polymer compound is measured in terms of polyacrylic acid by gel permeation chromatography (GPC).

The concentration of the water-soluble polymer compound in the polishing composition is preferably 0.0001% by mass or more and 1.0% by mass or less, more preferably 0.001% by mass or more and 0.5% by mass or less, still more preferably 0.005% by mass or more and 0.2% by mass or less, and particularly preferably 0.01% by mass or more and 0.1% by mass or less in terms of a solid content.

1-4. Other Components

As particles contained in the polishing composition, particles other than colloidal silica and wet-process silica particles can be contained. However, it is particularly preferable to contain no alumina particles from a viewpoint of reducing embedding of the alumina particles into a substrate to be polished.

In addition to the silica particles and the water-soluble polymer compound, the polishing composition preferably contains an acid. The acid may be an acid and/or a salt thereof. Specific examples of the acid include: an inorganic acid such as nitric acid, sulfuric acid, hydrochloric acid, phosphoric acid, phosphonic acid, phosphinic acid, pyrophosphoric acid, or tripolyphosphoric acid; an organic phosphonic acid such as 2-aminoethylphosphonic acid, 1-hydroxyethylidene-1,1-diphosphonic acid, aminotri (methylenephosphonic acid), ethylenediamine tetra (methylenephosphonic acid), diethylenetriamine (methylenephosphonic acid), ethane-1,1-diphosphonic acid, or methane hydroxyphosphonic acid; an amino carboxylic acid such as glutamic acid or aspartic acid; and a carboxylic acid such as citric acid, tartaric acid, oxalic acid, nitroacetic acid, or maleic acid. A counter ion in a case of using these acids is not particularly limited, and specific examples thereof include ions of a metal, ammonium, and alkylammonium.

In addition to the silica particles and the water-soluble polymer compound, the polishing composition preferably contains an oxidizing agent. Examples of the oxidizing agent include a peroxide, permanganic acid or a salt thereof, and chromic acid or a salt thereof. Specific examples thereof include hydrogen peroxide, sodium peroxide, barium peroxide, and potassium permanganate. Among these compounds, hydrogen peroxide is preferable.

In addition to the above-described components, the polishing composition may contain a fungicide, a microbicide, or the like.

1-5. Physical Properties

The polishing composition has a pH value of preferably 0.1 to 4.0, more preferably 0.5 to 3.0. The pH value of the polishing composition of 0.1 or more can suppress deterioration of surface smoothness. The pH value of the polishing composition of 4.0 or less can suppress lowering of a polishing rate.

The polishing composition according to at least one embodiment can be used for polishing various electronic components such as a semiconductor or a magnetic recording medium including a hard disk. Particularly, the polishing composition according to at least one embodiment can be used preferably for polishing an aluminum magnetic disk substrate formed of an aluminum alloy. The polishing composition according to at least one embodiment can be more preferably used for polishing an electroless nickel-phosphorus plated aluminum magnetic disk substrate. Electroless nickel-phosphorus plating is usually performed at a pH of 4.0 to 6.0. Nickel tends to be dissolved at a pH of less than 4.0, and therefore plating does not proceed easily. Meanwhile, in polishing, for example, nickel tends to be dissolved at a pH of less than 4.0, and therefore use of the polishing composition according to at least one embodiment can increase a polishing rate.

2. Method for Polishing Magnetic Disk Substrate

The polishing composition is suitable for use in polishing a magnetic disk substrate such as an electroless nickel-phosphorus plated aluminum magnetic disk substrate (hereinafter, referred to as an "aluminum disk") or a glass magnetic disk substrate. Particularly, the polishing composition is suitable for use in polishing an aluminum disk. Therefore, at least one embodiment is a method for polishing a magnetic disk substrate, including polishing a magnetic disk substrate using the above-described polishing composition. In addition, the polishing composition can also be used for polishing a semiconductor substrate such as silicon carbide, silicon, germanium, gallium arsenide, gallium phosphorus, indium phosphorus, or gallium nitride, a single crystal substrate such as sapphire, lithium tantalate, or lithium niobate, a magnetic head, or the like.

Examples of a polishing method to which the polishing composition according to at least one embodiment can be applied include a method for pasting a polishing pad on a surface plate of a polishing machine, supplying a polishing composition to a surface to be polished in a polishing target (for example, an aluminum disk) or the polishing pad, and rubbing the surface to be polished with the polishing pad (referred to as polishing). For example, in a case where front and back surfaces of an aluminum disk are polished simultaneously, a double-side polishing machine in which polishing pads are pasted on an upper surface plate and a lower surface plate is used. In this method, an aluminum disk is sandwiched by polishing pads pasted on an upper surface plate and a lower surface plate, a polishing composition is supplied between a polishing surface and each of the polishing pads, the two polishing pads are rotated simultaneously, and front and back surfaces of the aluminum disk are thereby polished.

A polyurethane type, suede type, nonwoven fabric type, or any other type polishing pad can be used.

EXAMPLES

Hereinafter, various embodiments will be specifically described based on Examples. However, the various embodiments are not limited to these Examples, and can be performed in various modes within the technical scope of the invention.

(1) Method for Preparing Polishing Composition

Examples 1 to 21 and Comparative Examples 1 to 20

Polishing compositions used in Examples 1 to 21 and Comparative Examples 1 to 20 contain materials indicated below in the contents or addition amounts indicated below.

[Colloidal silica 1] (average particle size (D50): 51 nm on a cumulative volume basis, commercially available colloidal silica) The content thereof is indicated in Tables 1 to 4. Colloidal silica 1 is not contained in Comparative Examples 2, 9, 10, and 16.

[Colloidal Silica 2] (average particle size (D50): 112 nm on a cumulative volume basis, commercially available colloidal silica) The content thereof is indicated in Table 3. Colloidal Silica 2 is not contained in Examples 1 to 14, 16 to 21, and Comparative Examples 1 to 20.

[Wet-process silica 1] (average particle size (D50): 0.3 µm, commercially available wet-process silica) The content thereof is indicated in Tables 1, 3, and 4. Wet-process silica 1 is not contained in Examples 6 to 10, Comparative Examples 1, 3, and 10 to 16.

[Wet-process silica 2] (average particle size (D50): 0.4 µm, commercially available wet-process silica) The content thereof is indicated in Table 2. Wet-process silica 2 is not contained in Examples 1 to 5 and 11 to 21 and Comparative Examples 1 to 9 and 17 to 20.

[Sulfuric acid] 1.34% by mass (adjusted to this concentration in all of Examples 1 to 21 and Comparative Examples 1 to 20)

[Hydrogen peroxide] 0.9% by mass (adjusted to this concentration in all of Examples 1 to 21 and Comparative Examples 1 to 20)

[Ammonia] 0.22% by mass (adjusted to this concentration in all of Examples 1 to 21 and Comparative Examples 1 to 20)

[Acrylic polymer 1] (copolymer of acrylic acid/N-tert-butylacrylamide=86/14 (molar ratio), weight average molecular weight: 9,000) The addition amount thereof is indicated in Tables 1 to 4. Acrylic polymer 1 is not contained in Examples 20 and 21 and Comparative Examples 3 to 9 and 11 to 20.

A 10% by mass aqueous solution of acrylic polymer 1 usually has a pH value of 3.8. In Examples 1 to 15 and Comparative Examples 1, 2, and 10, this ordinary acrylic polymer 1 was used.

In addition, by adding a sodium hydroxide aqueous solution to acrylic polymer 1, 10% by mass aqueous solutions of acrylic polymer 1 in which pH values were adjusted to 5.3, 7.6, 8.9, and 10.8 were prepared. As acrylic polymer 1, a solution having the pH value of 5.3, a solution having the pH value of 7.6, a solution having the pH value of 8.9, and a solution having the pH value of 10.8 were used in Examples 16, 17, 18, and 19, respectively.

[Acrylic polymer 2] (copolymer of acrylic acid/N-tert-butylacrylamide=86/14 (molar ratio), weight average molecular weight: 120,000) The addition amount thereof is indicated in Table 4. Acrylic polymer 2 was used in Example 20.

A 10% by mass aqueous solution of acrylic polymer 2 usually has a pH value of 3.8.

[Acrylic polymer 3] (copolymer of acrylic acid/N-tert-butylacrylamide=86/14 (molar ratio), weight average molecular weight: 340,000) The addition amount thereof is indicated in Table 4. Acrylic polymer 3 was used in Example 21.

A 10% by mass aqueous solution of acrylic polymer 3 usually has a pH value of 3.8.

[Sodium lauryl sulfate] (manufactured by Toho Chemical Industry Co., Ltd., Alscope LS-30, indicated as "LS-30" in Table 4) 0.02% by mass Sodium lauryl sulfate was used in Comparative Examples 17 and 19.

[Polyoxyethylene tridecyl ether sodium sulfate] (manufactured by DKS Co. Ltd., Hitenol 330T, indicated as "330T" in Table 4) 0.02% by mass Polyoxyethylene tridecyl ether sodium sulfate was used in Comparative Examples 18 and 20.

Note that three kinds of silica particles of colloidal silica 1, colloidal silica 2, and wet-process silica 1 were used in Example 15. The contents thereof are indicated in Table 3. A content ratio between colloidal silica 1 and colloidal silica 2 is 64 : 22. An average particle size (D50) of colloidal silica 1 and colloidal silica 2 as a whole was 63 nm on a cumulative volume basis.

A particle size (Heywood diameter) of colloidal silica was measured as a Heywood diameter (projected area equivalent circular diameter) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average particle size of colloidal silica is an average particle size (D50) when the particle diameters of about 2000 particles of colloidal silica were analyzed as described above and the particle size at which the cumulative particle size distribution (on a cumulative volume basis) from a smaller particle size reaches 50% is calculated using an above-mentioned analysis software (Mac-View Ver. 4.0, manufactured by Mountech CO., Ltd.).

An average particle size of wet-process silica particles was measured using a dynamic light scattering particle size distribution analyzer (manufactured by Nikkiso Co., Ltd., Microtrac UPA) for particles of 0.4 μm or less, and was measured using a laser diffraction particle size distribution analyzer (manufactured by Shimadzu Corporation, SALD 2200) for particles of more than 0.4 μm. The average particle size of the wet-process silica particles is an average particle size (D50) at which the cumulative particle size distribution from a smaller particle size reaches 50% on a volume basis.

Comparative Examples 21 to 24

Polishing compositions used in Comparative Examples 21 to 24 contain materials indicated below in the contents or addition amounts indicated below.

[Alumina] (average particle size (D50): 0.4 μm, commercially available alumina) The content thereof is indicated in Table 5.

[Sulfuric acid] 0.91% by mass (adjusted to this concentration in all of Comparative Examples 21 to 24)

[HEDP (1-hydroxyethylidene-1,1-diphosphonic acid)] 0.61% by mass (adjusted to this concentration in all of Comparative Examples 21 to 24)

[Hydrogen peroxide] 0.46% by mass (adjusted to this concentration in all of Comparative Examples 21 to 24)

[Ammonia] 0.10% by mass (adjusted to this concentration in all of Comparative Examples 21 to 24)

[Acrylic polymer 1] (copolymer of acrylic acid/N-tert-butylacrylamide=86/14 (molar ratio), weight average molecular weight: 9,000) The addition amount thereof is indicated in Table 5. Acrylic polymer 1 is not contained in Comparative Examples 21 and 24.

A 10% by mass aqueous solution of acrylic polymer 1 usually has a pH value of 3.8. In Comparative Examples 22 and 23, this ordinary acrylic polymer 1 was used.

[Polyoxyethylene tridecyl ether sodium sulfate] (manufactured by DKS Co. Ltd., Hitenol 330T, indicated as "330T" in Table 5) 0.06% by mass Polyoxyethylene tridecyl ether sodium sulfate was used in Comparative Example 24.

An average particle size of alumina particles was measured using a laser diffraction particle size distribution analyzer (manufactured by Shimadzu Corporation, SALD 2200). The average particle size of alumina particles is an average particle size (D50) having 50% of a cumulative particle size distribution from a small particle size side on a volume basis.

(2) Polishing Conditions

An electroless nickel-phosphorus plated aluminum disk having an outer diameter of 95 mm was polished as a substrate to be polished under the following polishing conditions.

Polishing machine: manufactured by System Seiko Co., Ltd., 9B double-side polishing machine Polishing pad: manufactured by FILWEL Co., Ltd., P1 pad Surface plate rotating speed: upper surface plate: −13.0 min$^{-1}$ Lower surface plate: 16.0 min$^{-1}$ Feed of polishing composition: 70 ml/min Polishing time: Polishing is performed until the polishing amount becomes 1.2 to 1.5 μm/side. (240 to 720 seconds)

Processing pressure: 120 kPa (Examples 1 to 21 and Comparative Examples 1 to 20), 80 kPa (Comparative Examples 21 to 24)

(3) Evaluation of Disk Surface Polished (3-1) Polishing Rate Ratio

The mass of an aluminum disk reduced after polishing was measured, and a polishing rate was calculated based on the following formula.

Polishing rate (μm/min)=reduction in mass of aluminum disk (g)/polishing time (min)/area of one side of aluminum disk (cm$^2$)/density of electroless nickel-phosphorus plated film (g/cm$^3$)/2×10$^4$ (Provided that, in the above formula, area of one side of aluminum disk is 65.9 cm$^2$ and density of electroless nickel-phosphorus plated film is 8.0 g/cm$^3$.)

A polishing rate ratio is a relative value in a case where a polishing rate in Comparative Example obtained using the above formula is assumed to be 1 (reference). For Examples 1 to 21 and Comparative Examples 1 to 20, a polishing rate in Comparative Example 3 was assumed to be 1 (reference). For Comparative Examples 21 to 24, a polishing rate in Comparative Example 21 was assumed to be 1 (reference). Note that a polishing rate in Comparative Example 3 was 0.111 μm/min, and a polishing rate in Comparative Example 21 was 0.325 μm/min (3-2) Pit A pit was measured using a three-dimensional surface structure analyzing microscope using a scanning white-light interferometry manufactured by Zygo Corp. A pit was measured using a measurement device (New View 5032 (lens: 2.5 times, zoom: 0.5 times)) manufactured by Zygo Corp. and an analysis software (Metro Pro) manufactured by Zygo Corp. In an obtained shape profile, a case where a pit was hardly observed was evaluated as "○ (good)". A case where a few pits were observed was evaluated as "A (allowable)". A case where many pits were observed was evaluated as "× (not allowable)". In a case where evaluation was "× (not allowable)", a pit could be observed visually.

(3-3) Surface Roughness (Zygo-Ra)

Surface roughness (Ra) of an aluminum disk was measured using a three-dimensional surface structure analysis microscope using a scanning white-light interferometry manufactured by Zygo Corp. (hereinafter, surface roughness measured by this method is referred to as "Zygo-Ra"). As measurement conditions, a measurement device manufactured by Zygo Corp. (New View 5032 (lens: 2.5 times, zoom: 0.5 times)) and an analysis software (Metro Pro) manufactured by Zygo Corp. were used, a filter FFT Fixed Pass was used, a wavelength was set to 0.00 to 0.08 mm, and a measurement area was set to 5.68 mm×4.26 mm "Unmeasurable in surface roughness" indicates that a pit is observed and surface roughness cannot be measured by the above measurement method.

(3-4) Roll-Off Ratio

As evaluation of an end face shape, roll-off with a numerical value of the degree of edge rounding was measured. Roll-off was measured using a measurement device (New View 5032 (lens: 2.5 times, zoom: 0.5 times)) manufactured by Zygo Corp. and an analysis software (Metro Pro) manufactured by Zygo Corp.

Figure 1:
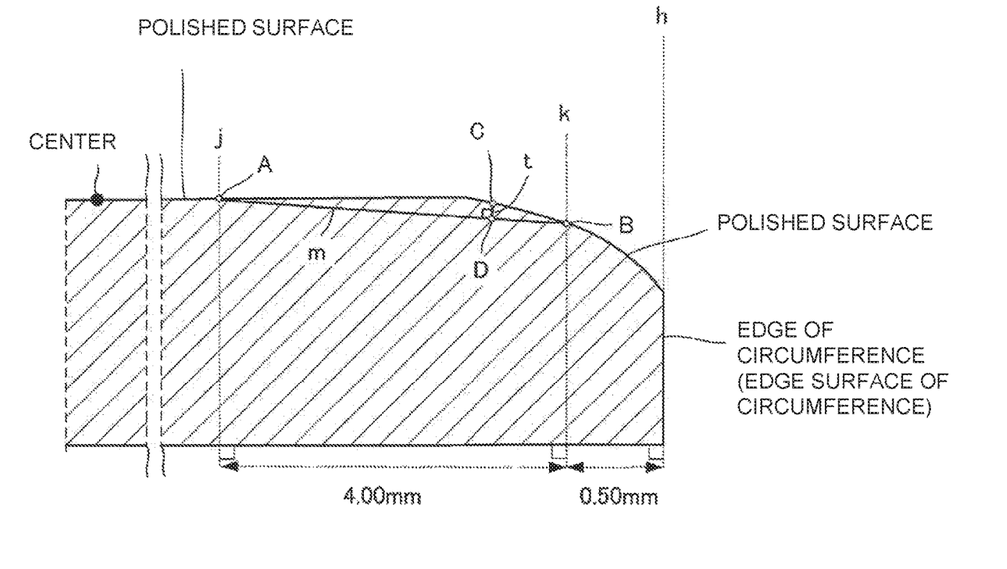
FIG. 1 is a cross-sectional view of a substrate for describing measurement of roll-off when a surface of the substrate is polished.

A method for measuring roll-off will be described with reference to FIG. 1. FIG. 1 illustrates a cross-sectional view of an electroless nickel-phosphorus plated aluminum disk having an outer diameter of 95 mm as a polishing target, perpendicular to a polished surface passing through the center of the disk. In order to measure roll-off, a perpendicular line h was first provided along an edge of circumference of a disk, a line j parallel to the perpendicular line h and having a distance of 4.50 mm from the perpendicular line h toward the center of the disk on a polished surface was provided, and a position where a line of a cross section of the disk crossed the line j was defined as point A. In addition, a line k parallel to the perpendicular line h and having a distance of 0.50 mm from the perpendicular line h was provided, and a position where the line of the cross section of the disk crossed the line k was defined as point B. A line m connecting point A and point B was provided, a line t perpendicular to line m was further provided, a position where the line of the cross section of the disk crossed line t was defined as point C, and a position where line m crossed line t was defined as point D. In addition, a distance where a distance between points C and D was the maximum was measured as roll-off.

A roll-off ratio is a relative value in a case where roll-off in Comparative Example obtained using the above formula is assumed to be 1 (reference). For Examples 1 to 21 and Comparative Examples 1 to 20, roll-off in Comparative Example 3 was assumed to be 1 (reference). For Comparative Examples 21 to 24, roll-off in Comparative Example 21 was assumed to be 1 (reference). Note that roll-off in Comparative Example 3 was 83.5 nm, and roll-off in Comparative Example 21 was 11.1 nm. Tables 1 to 4 indicate a relative value in roll-off between Comparative Example "containing no water-soluble polymer compound" and Example "containing a water-soluble polymer compound" although Comparative Example and Example contain silica particles in the same composition (a value of a ratio of roll-off in Example with respect to roll-off in corresponding Comparative Example). Note that, in Tables 1 and 2, "unmeasurable in roll-off ratio" indicates that many pits are observed and roll-off cannot be measured by the above measurement method.

TABLE 1

| | Colloidal silica | | Wet-process silica | | Total | | | Water-soluble polymer compound | | | |
| --- | --- | --- | --- | --- | --- | --- | --- | --- | --- | --- | --- |
| | Kind | Average particle size D50 (nm) | Kind | Average particle size D50 (μm) | silica concentration (% by mass) | Particle size ratio | Colloidal silica:wet-process silica (Mass ratio) | Kind | 10% aqueous solution pH | Addition amount (% by mass) | pH |
| Comparative Example 1 | Colloidal silica 1 | 51 | None | — | 4.4 | 5.9 | 10:0 | Acrylic polymer 1 | 3.8 | 0.02 | 1.2 |
| Example 1 | Colloidal silica 1 | 51 | Wet-process silica 1 | 0.3 | 4.4 | | 9:1 | Acrylic polymer 1 | 3.8 | 0.02 | 1.2 |
| Example 2 | Colloidal silica 1 | 51 | Wet-process silica 1 | 0.3 | 4.4 | | 7:3 | Acrylic polymer 1 | 3.8 | 0.02 | 1.2 |
| Example 3 | Colloidal silica 1 | 51 | Wet-process silica 1 | 0.3 | 4.4 | | 5:5 | Acrylic polymer 1 | 3.8 | 0.02 | 1.2 |
| Example 4 | Colloidal silica 1 | 51 | Wet-process silica 1 | 0.3 | 4.4 | | 3:7 | Acrylic polymer 1 | 3.8 | 0.02 | 1.2 |
| Example 5 | Colloidal silica 1 | 51 | Wet-process silica 1 | 0.3 | 4.4 | | 1:9 | Acrylic polymer 1 | 3.8 | 0.02 | 1.2 |
| Comparative Example 2 | None | — | Wet-process silica 1 | 0.3 | 4.4 | | 0:10 | Acrylic polymer 1 | 3.8 | 0.02 | 1.2 |
| Comparative Example 3 | Colloidal silica 1 | 51 | None | — | 4.4 | 5.9 | 10:0 | None | — | — | 1.2 |
| Comparative Example 4 | Colloidal silica 1 | 51 | Wet-process silica 1 | 0.3 | 4.4 | | 9:1 | None | — | — | 1.2 |
| Comparative Example 5 | Colloidal silica 1 | 51 | Wet-process silica 1 | 0.3 | 4.4 | | 7:3 | None | — | — | 1.2 |
| Comparative Example 6 | Colloidal silica 1 | 51 | Wet-process silica 1 | 0.3 | 4.4 | | 5:5 | None | — | — | 1.2 |
| Comparative Example 7 | Colloidal silica 1 | 51 | Wet-process silica 1 | 0.3 | 4.4 | | 3:7 | None | — | — | 1.2 |
| Comparative Example 8 | Colloidal silica 1 | 51 | Wet-process silica 1 | 0.3 | 4.4 | | 1:9 | None | — | — | 1.2 |
| Comparative Example 9 | None | — | Wet-process silica 1 | 0.3 | 4.4 | | 0:10 | None | — | — | 1.2 |

TABLE 1-continued

| | | Polishing rate ratio (With respect to Comparative Example 3) | Pit | Surface roughness Zygo-Ra (Å) | Roll-off ratio (With respect to Comparative Example 3) | Roll-off ratio with respect to water-soluble polymer compound-free system | |
|---|---|---|---|---|---|---|---|
| | | | | | | Roll-off ratio | Comparison target |
| | Comparative Example 1 | 0.97 | ○ (Good) | 1.30 | 1.00 | 1.00 | Comparative Example 3 |
| | Example 1 | 1.41 | ○ (Good) | 1.53 | 0.97 | 0.90 | Comparative Example 4 |
| | Example 2 | 1.75 | ○ (Good) | 1.69 | 0.85 | 0.78 | Comparative Example 5 |
| | Example 3 | 2.13 | ○ (Good) | 1.89 | 0.54 | 0.61 | Comparative Example 6 |
| | Example 4 | 2.50 | ○ (Good) | 1.92 | 0.37 | 0.52 | Comparative Example 7 |
| | Example 5 | 2.48 | ○ (Good) | 1.99 | 0.30 | 0.58 | Comparative Example 8 |
| | Comparative Example 2 | 1.69 | X (Not allowable) | Unmeasurable | Unmeasurable | — | Comparative Example 9 |
| | Comparative Example 3 | 1 | ○ (Good) | 1.37 | 1 | 1.00 | Comparative Example 3 |
| | Comparative Example 4 | 1.22 | ○ (Good) | 1.52 | 1.08 | 1.00 | Comparative Example 4 |
| | Comparative Example 5 | 1.43 | ○ (Good) | 1.74 | 1.09 | 1.00 | Comparative Example 5 |
| | Comparative Example 6 | 1.65 | ○ (Good) | 1.95 | 0.89 | 1.00 | Comparative Example 6 |
| | Comparative Example 7 | 1.94 | ○ (Good) | 2.00 | 0.71 | 1.00 | Comparative Example 7 |
| | Comparative Example 8 | 1.98 | Δ (Allowable) | 2.23 | 0.52 | 1.00 | Comparative Example 8 |
| | Comparative Example 9 | 1.49 | X (Not allowable) | Unmeasurable | Unmeasurable | — | Comparative Example 9 |

TABLE 2

| | Colloidal silica | | Wet-process silica | | | | Colloidal silica:wet-process silica (Mass ratio) | Water-soluble polymer compound | | | |
|---|---|---|---|---|---|---|---|---|---|---|---|
| | Kind | Average particle size D50 (nm) | Kind | Average particle size D50 (μm) | Total silica concentration (% by mass) | Particle size ratio | | Kind | 10% aqueous solution pH | Addition amount (% by mass) | pH |
| Comparative Example 1 | Colloidal silica 1 | 51 | None | — | 4.4 | 7.8 | 10:0 | Acrylic polymer 1 | 3.8 | 0.02 | 1.2 |
| Example 6 | Colloidal silica 1 | 51 | Wet-process silica 2 | 0.4 | 4.4 | | 9:1 | Acrylic polymer 1 | 3.8 | 0.02 | 1.2 |
| Example 7 | Colloidal silica 1 | 51 | Wet-process silica 2 | 0.4 | 4.4 | | 7:3 | Acrylic polymer 1 | 3.8 | 0.02 | 1.2 |
| Example 8 | Colloidal silica 1 | 51 | Wet-process silica 2 | 0.4 | 4.4 | | 5:5 | Acrylic polymer 1 | 3.8 | 0.02 | 1.2 |
| Example 9 | Colloidal silica 1 | 51 | Wet-process silica 2 | 0.4 | 4.4 | | 3:7 | Acrylic polymer 1 | 3.8 | 0.02 | 1.2 |
| Example 10 | Colloidal silica 1 | 51 | Wet-process silica 2 | 0.4 | 4.4 | | 1:9 | Acrylic polymer 1 | 3.8 | 0.02 | 1.2 |
| Comparative Example 10 | None | — | Wet-process silica 2 | 0.4 | 4.4 | | 0:10 | Acrylic polymer 1 | 3.8 | 0.02 | 1.2 |
| Comparative Example 3 | Colloidal silica 1 | 51 | None | — | 4.4 | 7.8 | 10:0 | None | — | — | 1.2 |
| Comparative Example 11 | Colloidal silica 1 | 51 | Wet-process silica 2 | 0.4 | 4.4 | | 9:1 | None | — | — | 1.2 |
| Comparative Example 12 | Colloidal silica 1 | 51 | Wet-process silica 2 | 0.4 | 4.4 | | 7:3 | None | — | — | 1.2 |
| Comparative Example 13 | Colloidal silica 1 | 51 | Wet-process silica 2 | 0.4 | 4.4 | | 5:5 | None | — | — | 1.2 |
| Comparative Example 14 | Colloidal silica 1 | 51 | Wet-process silica 2 | 0.4 | 4.4 | | 3:7 | None | — | — | 1.2 |
| Comparative Example 15 | Colloidal silica 1 | 51 | Wet-process silica 2 | 0.4 | 4.4 | | 1:9 | None | — | — | 1.2 |
| Comparative Example 16 | None | — | Wet-process silica 2 | 0.4 | 4.4 | | 0:10 | None | — | — | 1.2 |

TABLE 2-continued

| | | Polishing rate ratio (With respect to Comparative Example 3) | Pit | Surface roughness Zygo-Ra (Å) | Roll-off ratio (With respect to Comparative Example 3) | Roll-off ratio with respect to water-soluble polymer compound-free system | |
|---|---|---|---|---|---|---|---|
| | | | | | | Roll-off ratio | Comparison target |
| | Comparative Example 1 | 0.97 | ○ (Good) | 1.30 | 1.00 | 1.00 | Comparative Example 3 |
| | Example 6 | 1.49 | ○ (Good) | 2.10 | 1.36 | 0.84 | Comparative Example 11 |
| | Example 7 | 2.17 | ○ (Good) | 2.52 | 1.30 | 0.76 | Comparative Example 12 |
| | Example 8 | 2.78 | ○ (Good) | 2.98 | 1.00 | 0.64 | Comparative Example 13 |
| | Example 9 | 3.03 | ○ (Good) | 3.42 | 0.62 | 0.53 | Comparative Example 14 |
| | Example 10 | 2.91 | ○ (Good) | 4.47 | 0.54 | 0.57 | Comparative Example 15 |
| | Comparative Example 10 | 2.09 | X (Not allowable) | Unmeasurable | Unmeasurable | — | Comparative Example 16 |
| | Comparative Example 3 | 1 | ○ (Good) | 1.37 | 1 | 1.00 | Comparative Example 3 |
| | Comparative Example 11 | 1.35 | ○ (Good) | 2.18 | 1.62 | 1.00 | Comparative Example 11 |
| | Comparative Example 12 | 1.78 | ○ (Good) | 2.74 | 1.72 | 1.00 | Comparative Example 12 |
| | Comparative Example 13 | 2.14 | ○ (Good) | 3.08 | 1.57 | 1.00 | Comparative Example 13 |
| | Comparative Example 14 | 2.43 | ○ (Good) | 3.52 | 1.16 | 1.00 | Comparative Example 14 |
| | Comparative Example 15 | 2.33 | ○ (Good) | 4.63 | 0.95 | 1.00 | Comparative Example 15 |
| | Comparative Example 16 | 1.89 | X (Not allowable) | Unmeasurable | Unmeasurable | — | Comparative Example 16 |

TABLE 3

| | Colloidal silica | | Wet-process silica | | | | Colloidal silica:wet-process silica (Mass ratio) | Water-soluble polymer compound | | |
|---|---|---|---|---|---|---|---|---|---|---|
| | Kind | Average particle size D50 (nm) | Kind | Average particle size D50 (μm) | Total silica concentration (% by mass) | Particle size ratio | | Kind | 10% aqueous solution pH | Addition amount (% by mass) |
| Comparative Example 5 | Colloidal silica 1 | 51 | Acrylic polymer 1 | 0.3 | 4.4 | 5.9 | 7:3 | None | — | — |
| Example 11 | Colloidal silica 1 | 51 | Wet-process silica 1 | 0.3 | 4.4 | | 7:3 | Acrylic polymer 1 | 3.8 | 0.005 |
| Example 12 | Colloidal silica 1 | 51 | Wet-process silica 1 | 0.3 | 4.4 | | 7:3 | Acrylic polymer 1 | 3.8 | 0.01 |
| Example 2 | Colloidal silica 1 | 51 | Wet-process silica 1 | 0.3 | 4.4 | | 7:3 | Acrylic polymer 1 | 3.8 | 0.02 |
| Example 13 | Colloidal silica 1 | 51 | Wet-process silica 1 | 0.3 | 4.4 | | 7:3 | Acrylic polymer 1 | 3.8 | 0.10 |
| Example 14 | Colloidal silica 1 | 51 | Wet-process silica 1 | 0.3 | 4.4 | | 7:3 | Acrylic polymer 1 | 3.8 | 1.00 |
| Example 15 | Colloidal silica 1 64 Colloidal silica 1 22 | (51) 63 (112) | Wet-process silica 1 | 0.3 | 4.4 | 4.8 | 86:14 | Acrylic polymer 1 | 3.8 | 0.02 |

| | | pH | Polishing rate ratio (With respect to Comparative Example 3) | Pit | Surface roughness Zygo-Ra (Å) | Roll-off ratio (With respect to Comparative Example 3) | Roll-off ratio with respect to water-soluble polymer compound-free system | |
|---|---|---|---|---|---|---|---|---|
| | | | | | | | Roll-off ratio | Comparison target |
| | Comparative Example 5 | 1.2 | 1.43 | ○ (Good) | 1.74 | 1.09 | 1.00 | Comparative Example 5 |

TABLE 3-continued

| | | | | | | | |
|---|---|---|---|---|---|---|---|
| Example 11 | 1.2 | 1.69 | ○ (Good) | 1.67 | 1.02 | 0.94 | Comparative Example 5 |
| Example 12 | 1.2 | 1.71 | ○ (Good) | 1.68 | 0.93 | 0.85 | Comparative Example 5 |
| Example 2 | 1.2 | 1.75 | ○ (Good) | 1.69 | 0.85 | 0.78 | Comparative Example 5 |
| Example 13 | 1.2 | 1.74 | ○ (Good) | 1.65 | 0.73 | 0.67 | Comparative Example 5 |
| Example 14 | 1.2 | 1.65 | Δ (Allowable) | 1.64 | 0.60 | 0.55 | Comparative Example 5 |
| Example 15 | 1.2 | 1.70 | ○ (Good) | 1.97 | 0.47 | — | — |

TABLE 4

| | Colloidal silica | | Wet-process silica | | | | Colloidal silica:wet-process silica | Water-soluble polymer compound | | | |
|---|---|---|---|---|---|---|---|---|---|---|---|
| | Kind | Average particle size D50 (nm) | Kind | Average particle size D50 (μm) | Total silica concentration (% by mass) | Particle size ratio | (Mass ratio) | Kind | 10% Aqueous solution pH | Addition amount (% by mass) | pH |
| Comparative Example 6 | Colloidal silica 1 | 51 | Wet-process silica 1 | 0.3 | 4.4 | 5.9 | 5:5 | None | — | — | 1.2 |
| Example 3 | Colloidal silica 1 | 51 | Wet-process silica 1 | 0.3 | 4.4 | | 5:5 | Acrylic polymer 1 | 3.8 | 0.02 | 1.2 |
| Example 16 | Colloidal silica 1 | 51 | Wet-process silica 1 | 0.3 | 4.4 | | 5:5 | Acrylic polymer 1 | 5.3 | 0.02 | 1.2 |
| Example 17 | Colloidal silica 1 | 51 | Wet-process silica 1 | 0.3 | 4.4 | | 5:5 | Acrylic polymer 1 | 7.6 | 0.02 | 1.2 |
| Example 18 | Colloidal silica 1 | 51 | Wet-process silica 1 | 0.3 | 4.4 | | 5:5 | Acrylic polymer 1 | 8.9 | 0.02 | 1.2 |
| Example 19 | Colloidal silica 1 | 51 | Wet-process silica 1 | 0.3 | 4.4 | | 5:5 | Acrylic polymer 1 | 10.8 | 0.02 | 1.2 |
| Comparative Example 6 | Colloidal silica 1 | 51 | Wet-process silica 1 | 0.3 | 4.4 | 5.9 | 5:5 | None | — | — | 1.2 |
| Example 3 | Colloidal silica 1 | 51 | Wet-process silica 1 | 0.3 | 4.4 | | 5:5 | Acrylic polymer 1 | 3.8 | 0.02 | 1.2 |
| Example 20 | Colloidal silica 1 | 51 | Wet-process silica 1 | 0.3 | 4.4 | | 5:5 | Acrylic polymer 1 | 3.8 | 0.02 | 1.2 |
| Example 21 | Colloidal silica 1 | 51 | Wet-process silica 1 | 0.3 | 4.4 | | 5:5 | Acrylic polymer 1 | 3.8 | 0.02 | 1.2 |
| Comparative Example 5 | Colloidal silica 1 | 51 | Wet-process silica 1 | 0.3 | 4.4 | 5.9 | 7:3 | None | — | — | 1.2 |
| Example 2 | Colloidal silica 1 | 51 | Wet-process silica 1 | 0.3 | 4.4 | | 7:3 | Acrylic polymer 1 | 3.8 | 0.02 | 1.2 |
| Comparative Example 17 | Colloidal silica 1 | 51 | Wet-process silica 1 | 0.3 | 4.4 | | 7:3 | LS-30 | — | 0.02 | 1.2 |
| Comparative Example 18 | Colloidal silica 1 | 51 | Wet-process silica 1 | 0.3 | 4.4 | | 7:3 | 330T | — | 0.02 | 1.2 |
| Comparative Example 6 | Colloidal silica 1 | 51 | Wet-process silica 1 | 0.3 | 4.4 | 5.9 | 5:5 | None | 3.8 | 0.02 | 1.2 |
| Example 3 | Colloidal silica 1 | 51 | Wet-process silica 1 | 0.3 | 4.4 | | 5:5 | Acrylic polymer 1 | — | 0.02 | 1.2 |
| Comparative Example 19 | Colloidal silica 1 | 51 | Wet-process silica 1 | 0.3 | 4.4 | | 5:5 | LS-30 | 3.8 | 0.02 | 1.2 |
| Comparative Example 20 | Colloidal silica 1 | 51 | Wet-process silica 1 | 0.3 | 4.4 | 5.9 | 5:5 | 330T | — | 0.02 | 1.2 |

| | Polishing rate ratio (With respect to Comparative Example 3) | Pit | Surface roughness Zygo-Ra (Å) | Roll-off ratio (With respect to Comparative Example 3) | Roll-off ratio with respect to water-soluble polymer compound-free system | |
|---|---|---|---|---|---|---|
| | | | | | Roll-off ratio | Comparison target |
| Comparative Example 6 | 1.65 | ○ (Good) | 1.95 | 0.89 | 1.00 | Comparative Example 6 |
| Example 3 | 2.13 | ○ (Good) | 1.89 | 0.54 | 0.61 | Comparative Example 6 |
| Example 16 | 2.09 | ○ (Good) | 1.90 | 0.58 | 0.65 | Comparative Example 6 |
| Example 17 | 2.05 | ○ (Good) | 1.88 | 0.59 | 0.66 | Comparative Example 6 |
| Example 18 | 2.07 | ○ (Good) | 1.89 | 0.58 | 0.65 | Comparative Example 6 |

TABLE 4-continued

| | | | | | | | |
|---|---|---|---|---|---|---|---|
| Example 19 | 2.05 | ○ (Good) | 1.88 | 0.61 | 0.69 | Comparative Example 6 | |
| Comparative Example 6 | 1.65 | ○ (Good) | 1.95 | 0.89 | 1.00 | Comparative Example 6 | |
| Example 3 | 2.13 | ○ (Good) | 1.89 | 0.54 | 0.61 | Comparative Example 6 | |
| Example 20 | 2.07 | ○ (Good) | 1.88 | 0.59 | 0.66 | Comparative Example 6 | |
| Example 21 | 2.04 | ○ (Good) | 1.89 | 0.63 | 0.71 | Comparative Example 6 | |
| Comparative Example 5 | 1.43 | ○ (Good) | 1.74 | 1.09 | 1.00 | Comparative Example 5 | |
| Example 2 | 1.75 | ○ (Good) | 1.69 | 0.85 | 0.78 | Comparative Example 5 | |
| Comparative Example 17 | 1.67 | Δ (Allowable) | 1.66 | 1.01 | 0.93 | Comparative Example 5 | |
| Comparative Example 18 | 1.65 | Δ (Allowable) | 1.68 | 1.00 | 0.92 | Comparative Example 5 | |
| Comparative Example 6 | 1.65 | ○ (Good) | 1.95 | 0.89 | 1.00 | Comparative Example 6 | |
| Example 3 | 2.13 | ○ (Good) | 1.89 | 0.54 | 0.61 | Comparative Example 6 | |
| Comparative Example 19 | 1.94 | ○ (Good) | 1.96 | 0.90 | 1.01 | Comparative Example 6 | |
| Comparative Example 20 | 2.04 | ○ (Good) | 1.95 | 0.70 | 0.79 | Comparative Example 6 | |

TABLE 5

| | Alumina | | | Water-soluble polymer compound | | | Polishing rate ratio (With | | | Roll-off ratio (With |
|---|---|---|---|---|---|---|---|---|---|---|
| | Kind | Average particle size D50 (μm) | Alumina concentration (% by mass) | Kind | 10% aqueous solution pH | Addition amount (% by mass) | pH | respect to Comparative Example 21) | Pit | Surface roughness Zygo-Ra (Å) | respect to Comparative Example 21) |
| Comparative Example 21 | Alumina | 0.4 | 4.4 | None | — | — | 1.2 | 1 | ○ (Good) | 2.32 | 1 |
| Comparative Example 22 | Alumina | 0.4 | 4.4 | Acrylic polymer 1 | 3.8 | 0.02 | 1.2 | 1.05 | ○ (Good) | 2.20 | 1.46 |
| Comparative Example 23 | Alumina | 0.4 | 4.4 | Acrylic polymer 1 | 3.8 | 0.06 | 1.2 | 1.03 | ○ (Good) | 2.15 | 1.40 |
| Comparative Example 24 | Alumina | 0.4 | 4.4 | 330T | — | 0.06 | 1.2 | 0.97 | ○ (Good) | 2.13 | 0.57 |

(4) Discussion

The results in Tables 1 to 5 indicate that a polishing rate in a case of using colloidal silica and wet-process silica particles in combination as in Examples 1 to 21 is significantly higher than a polishing rate predicted from a case of single use of the silica particles. Note that it is generally predicted that the polishing rate predicted from the case of single use of colloidal silica or wet-process silica particles fluctuates mainly correlating with the content of the wet-process silica particles. However, for example, the results in Examples 1 to 5 are remarkable results significantly exceeding this prediction. This is thought to be because a mutually complementary relationship between the colloidal silica and the wet-process silica particles is brought about in terms of polishing performance and as a synergistic effect, improves the polishing rate. Specifically, it is considered that colloidal silica adheres to surfaces of wet-process silica particles by using the wet-process silica particles and the colloidal silica in combination according to at least one embodiment. It is considered that such wet-process silica particles having colloidal silica adhering to surfaces thereof have improved polishing ability as compared with a case of use of the wet-process silica particles alone.

In addition, the polishing compositions in Examples 1 to 21 have improved polishing performance also in surface shape characteristics such as a pit and surface roughness. Also here, it is considered that wet-process silica particles having colloidal silica adhering to surfaces thereof are formed. It is considered that an effect of the colloidal silica adhering to the surfaces improves polishing ability of the wet-process silica particles and simultaneously improves surface smoothness. As described above, it is considered that a mutually complementary relationship is generated between both colloidal silica and wet-process silica particles also in surface smoothness, and a synergistic effect appears.

Furthermore, in the polishing compositions in Examples 1 to 21, roll-off was also specifically reduced by using a water-soluble polymer compound in combination with colloidal silica and wet-process silica particles. Furthermore, the results in Examples 3 and 16 to 21 indicate that an effect of reducing roll-off is observed in a case even where a pH of a 10% by mass aqueous solution of a water-soluble polymer compound is changed from an acidic region to an alkaline region, that is, even when at least a part of carboxyl groups as a structural unit derived from an unsaturated aliphatic carboxylic acid contained in the water-soluble polymer compound forms a salt.

Meanwhile, when Comparative Example 1 is compared with Comparative Example 3, in a case where a water-soluble polymer compound is added to colloidal silica, an effect of reducing roll-off is not observed. In Comparative Example 2, even when a water-soluble polymer compound is added to wet-process silica particles, a pit is generated, and an effect of the water-soluble polymer compound is not observed. When Comparative Examples 22 and 23 are compared with Comparative Example 21, in a case where a water-soluble polymer compound is added to alumina particles, it is found that roll-off is not reduced but gets worse. From the above, three polishing characteristics of a polishing rate, surface smoothness, and roll-off can be improved by combining three elements of colloidal silica, wet-process silica particles, and a water-soluble polymer compound.

INDUSTRIAL APPLICABILITY

The polishing composition according to various embodiments can be used for polishing an electronic component such as a semiconductor or a magnetic recording medium including a hard disk. Particularly, the polishing composition according to various embodiments can be used for polishing a surface of a substrate for a magnetic recording medium such as a glass magnetic disk substrate or an aluminum magnetic disk substrate. Furthermore, the polishing composition according to various embodiments can be used for polishing an aluminum magnetic disk substrate for a magnetic recording medium, having an electroless nickel-phosphorus plated film formed on a surface of an aluminum alloy substrate.

The invention claimed is:

1. A polishing composition comprising:
   colloidal silica;
   pulverized wet-process silica particles; and
   a water-soluble polymer compound,
   wherein the water-soluble polymer compound is a copolymer containing a structural unit derived from an unsaturated aliphatic carboxylic acid and a structural unit derived from an unsaturated amide,
   wherein the composition is an aqueous composition further comprising an acid and an oxidizing agent and having a pH value of 0.1 to 4.0, and
   wherein the composition is used for polishing an electroless nickel-phosphorous plated aluminum magnetic disk substrate.

2. The polishing composition according to claim 1, wherein the colloidal silica has an average particle size of 5 to 200 nm, and the pulverized wet-process silica particles have an average particle size of 0.1 to 1.0 μm.

3. The polishing composition according to claim 1, wherein a value of a ratio of the average particle size of the pulverized wet-process silica particles with respect to the average particle size of the colloidal silica is 2.0 to 30.0.

4. The polishing composition according to claim 1, wherein a total concentration of the colloidal silica and the pulverized wet-process silica particles is 1 to 50% by mass, and a ratio of the colloidal silica is 5 to 95% by mass and a ratio of the pulverized wet-process silica particles is 5 to 95% by mass with respect to a total mass of the colloidal silica and the pulverized wet-process silica particles.

5. The polishing composition according to claim 1, wherein the water- soluble polymer compound is a copolymer having a molar ratio of 95:5 to 5:95 between the structural unit derived from an unsaturated aliphatic carboxylic acid and the structural unit derived from an unsaturated amide.

6. The polishing composition according to claim 1, wherein the copolymer is formed of a combination of acrylic acid and/or a salt thereof and N-alkylacrylamide, a combination of acrylic acid and/or a salt thereof and N-alkylmethacrylamide, a combination of methacrylic acid and/or a salt thereof and N-alkylacrylamide, or a combination of methacrylic acid and/or a salt thereof and N-alkylmethacrylamide.

7. The polishing composition according to claim 1, wherein the water-soluble polymer compound has a weight average molecular weight of 3000 to 1,000,000.

8. The polishing composition according to claim 1, wherein the water-soluble polymer compound has a content of 0.0001 to 1.0% by mass.

* * * * *